United States Patent [19]
Chipman et al.
[11] 3,778,668
[45] Dec. 11, 1973

[54] AUTOMATIC BEAM CURRENT LIMITER

[75] Inventors: Jack R. Chipman; Donald McCombs, both of Fort Wayne, Ind.
[73] Assignee: The Magnavox Company, Fort Wayne, Ind.

[22] Filed: Jan. 24, 1972
[21] Appl. No.: 220,087

[52] U.S. Cl. .......... 315/30
[51] Int. Cl. .......... H01j 29/70
[58] Field of Search .......... 315/22, 18, 30, 20, 315/27 TD

[56] References Cited
UNITED STATES PATENTS

| | | | |
|---|---|---|---|
| 3,619,705 | 11/1971 | Waybright | 315/30 |
| 3,445,717 | 5/1969 | Eckenbrecht et al. | 315/30 |
| 3,535,445 | 10/1970 | Griffery | 315/30 |
| 3,585,299 | 6/1971 | Bockhorst | 315/30 X |

*Primary Examiner*—Carl D. Quarforth
*Assistant Examiner*—J. M. Potenza
*Attorney*—Richard T. Seeger et al.

[57] ABSTRACT

A circuit for limiting the beam current in a cathode ray tube or the current in the horizontal output tube comprising means for detecting changes in the average value of the cathode current of the horizontal output tube and providing an output indicative of these changes and means for diminishing the beam current when that output indicates a predetermined value has been exceeded is disclosed. The beam current is diminished by coupling the collector-emitter circuit of a switching transistor to an impedance intensity point in the receiver such as the brightness or bias control potentiometers and driving that switching transistor from the voltage across a capacitor which represents the average value of the current flowing in the horizontal output tube.

8 Claims, 5 Drawing Figures

AUTOMATIC BEAM CURRENT LIMITER

BACKGROUND OF THE INVENTION

The present invention relates to a circuit for limiting the beam current in a cathode ray tube and more especially in such a tube disposed in a home television receiver. The desirability of limiting the beam current in cathode ray tubes and most especially in color television receivers has long been recognized as being desirable in order to prevent damage to the components of the system. For example, it is fairly common procedure to provide a system for regulating the high voltage applied to the cathode ray tube by means of a shunt regulating tube or other voltage regulating scheme. This solves only part of the problem since relatively intense signals may still cause an undesirable increase in the beam current which results in an undesirable bright spot on the face of the cathode ray tube sometimes called "blooming." This problem has been recognized in U.S. Pat. No. 3,445,717, and that patent represents an attempt to alleviate the problem. Another attempt to alleviate a similar problem is illustrated in U.S. Pat. No. 3,543,944, which employs a control signal in response to the magnitude of video signals applied to the cathode ray tube to vary the intensity of an electron beam and light emitted by flying spot scanner tube. Another approach which addresses itself to this same type problem is illustrated in U.S. Pat. No. 3,541,240, wherein a circuit is employed to sense the amount of current flowing through a high voltage winding of a transformer used in the power supply and employs this current to control a switch coupled to the video amplifier chain. This switch serves to change the D. C. bias of the video chain in a direction to reduce the drive when the levels associated therewith become critical.

All of the above mentioned approaches are complex and costly since they somehow sense the high voltage system voltage or current and supply a corrective action in response thereto.

In many systems the weak link is the horizontal output tube rather than the cathode ray tube since the cathode current limitations of the horizontal output tube may be exceeded and that tube damaged before damage to the cathode ray tube or other components occurs. This is a particular problem in fifth harmonic flyback high voltage systems. It is, of course, a typical and well known procedure to obtain the cathode ray tube high voltage by passing the horizontal flyback signals through a step-up transformer and then rectifying and perhaps filtering to obtain a suitable high voltage for the cathode ray tube. It is also known to suitably design the leakage parameters of the high voltage transformer and perhaps to employ one or more tuned circuits in conjunction with that transformer so as to actually present the third or fifth harmonic of the flyback pulse to the rectifier for rectification. Such a fifth harmonic, for example, will be a much wider pulse near its crest as compared to the fundamental pulse which is much more narrow and of much greater magnitude. Thus the fifth harmonic pulse is capable of transferring greater energy at more reasonable high voltage levels. Such fifth harmonic flyback high voltage systems are well known in the art and, for example, are represented by U.S. Pat. Nos. 2,805,384 and 3,500,116.

When a fifth harmonic flyback and high voltage system is used in a color television receiver, some unsuspected problems arise. Present day third harmonic flyback and high voltage systems have an internal impedance in the neighborhood of 5 to 10 megohms. In this impedance range when the beam current in the cathode ray tube exceeds 1 to 1.5 milliamps, the high voltage regulation becomes very poor resulting in an objectionable picture for the observer. To obtain a good picture the viewer will readjust his receiver in such a manner that the beam current will be reduced to a reasonable level. In contradistinction, the fifth harmonic flyback and high voltage system has a much lower internal impedance in the neighborhood of 2 to 2.5 megohms and thus has a much better high voltage regulation at higher beam currents. With this better high voltage regulation the quality of the picture does not deteriorate when the beam current exceeds its limits, and thus a viewer will not readjust his set even though excessive currents are involved. Thus while the improved high voltage regulation seems desirable, it eliminates the viewer warning system that was built in to the set which had the relatively poor high voltage regulation, and thus when using a fifth harmonic flyback and high voltage system, some type of automatic limiter for the cathode ray tube beam current or horizontal output tube cathode current (depending on which is the weak link in the system) is desirable.

An automatic limiter for either the cathode ray tube beam current or the horizontal output tube cathode current is thus desirable for a number of reasons. It protects the horizontal output tube from excessive currents and power dissipation. It similarly protects the cathode ray tube from excessive currents and power dissipation. It further limits excessive currents due to misadjustment or malfunction of the cathode ray tube bias control, which, as is well known, must, due to the wide range of variation in picture tube cutoff voltages, have a relatively wide range of control. Excessive currents and power dissipation within a television receiver generate excessive heat and substantially shorten the life of many of the components within the receiver including especially those components experiencing the excessive currents.

SUMMARY OF THE INVENTION

In contradistinction to the aforementioned prior art approaches, the present invention provides a simple, economical low power system for sensing a current which reflects changes in the cathode ray tube beam current and employs this current to switch a switching transistor connected between ground and an impedance intensity point within the system such as, for example, the brightness or cathode ray tube bias control potentiometers. The switching of the transistor then, of course, gives an effect similar to manually changing one of these potentiometers.

The present invention functions to keep the cathode ray tube beam current below values which could damage the tube and also serves to keep the horizontal output tube power dissipation within reasonable limits. The circuit of the present invention has a very low power dissipation and has virtually no effect on the remaining circuitry until the beam current exceeds a predetermined limit. If the cathode ray tube bias is inaccurately set so as to produce higher beam currents than necessary, the circuit of the present invention corrects automatically for this misadjustment. The turn-on voltage of the transistor of the present invention decreases when the ambient temperature in the television cabinet increases thus decreasing the upper limit on the cathode ray tube beam current and reducing the dissipation in the horizontal output tube. All of these features contribute to a more reliable television circuit.

Accordingly it is one object of the present invention to provide a current limiting circuit having one or more of the foregoing features and advantages.

Yet another object of the present invention is to provide an economical circuit for limiting the beam current in a cathode ray tube.

It is another object of the present invention to provide a system for providing a low voltage signal which accurately reflects changes in the cathode ray tube beam current, yet avoids the problems and dangers associated with directly sensing the cathode ray tube high voltage beam current.

It is a further object of the present invention to provide a threshold device for limiting the beam current in a cathode ray tube and thus also limit the cathode current in a corresponding horizontal output tube.

A still further object of the present invention is to provide a system for detecting changes in the beam current of a cathode ray tube by sensing changes in the average value of the horizontal output tube cathode current.

These and other objects and advantages of the present invention will appear more clearly from the following detailed disclosure in conjunction with the accompanying drawings in which:

DESCRIPTION OF THE PREFERRED EMBODIMENTS

Figures 1, 2:
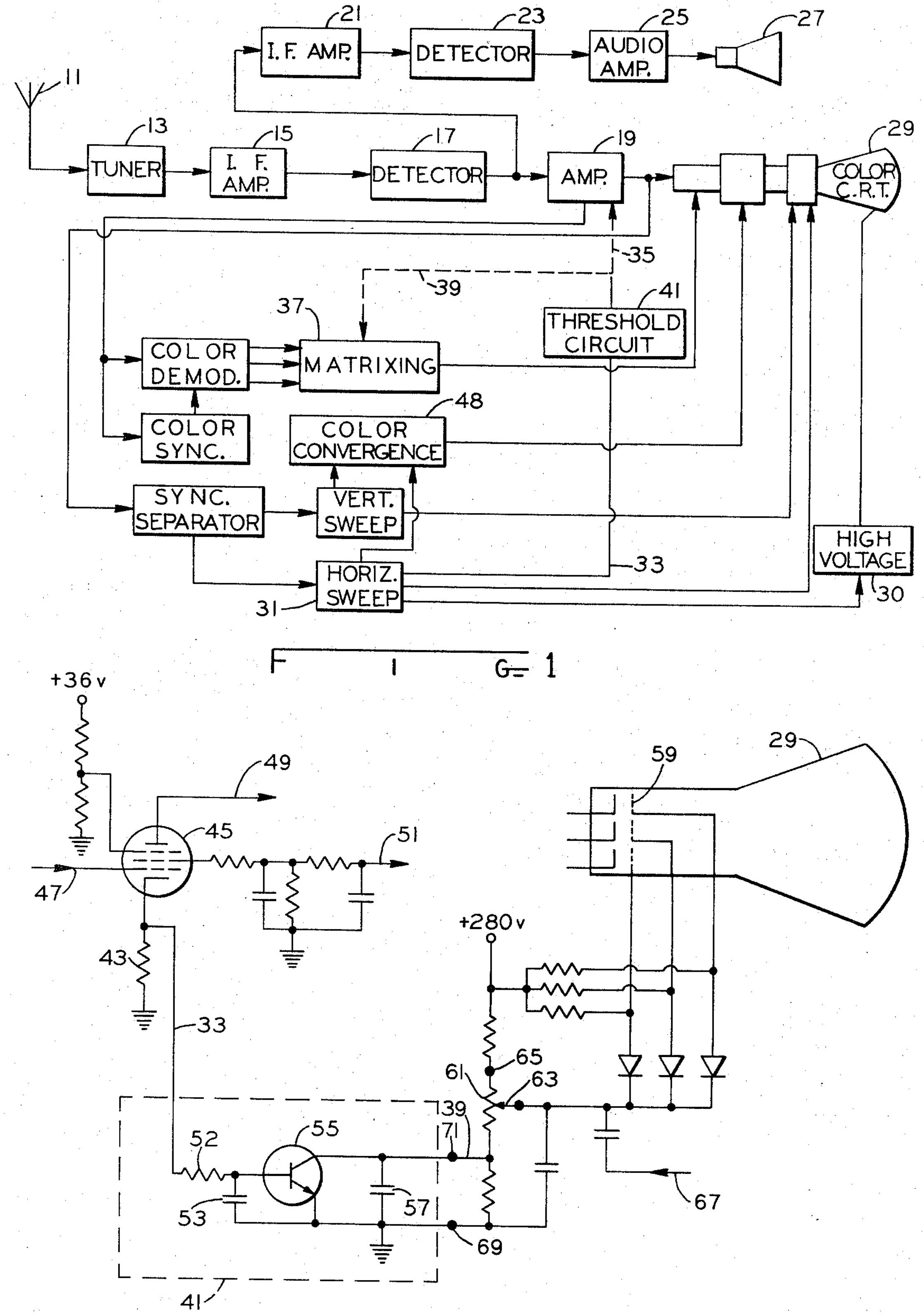
FIG. 1 is a block diagram of a color television receiver illustrating the source and alternate destinations of the control system of the present invention.
FIG. 2 is a schematic diagram of the important features of FIG. 1 when the control is applied to the cathode ray tube bias potentiometer.

Considering first FIG. 1 which illustrates a generalized block diagram for a color television receiver, that receiver is seen to consist of an antenna 11 which receives incoming signals and supplies them to a tuner 13, and the thus tuned signals are, by well known means, converted to an intermediate frequency and amplified in the intermediate frequency amplifier 15. A detector 17 supplies these signals to a video amplifier 19 as well as to an audio intermediate frequency amplifier 21. The audio signals are detected by the detector 23, further amplified by the audio amplifier 25, and provided as an audio output by way of the speaker 27. The output of the video amplifier stage 9 is, of course, fed to the color television picture tube 29. The color cathode ray tube 29 also receives convergence ahd matrixing signals and vertical and horizontal sweep signals in accordance with well known prior art techniques. The horizontal and vertical sweep signals may also be obtained in accordance with the teachings of copending application Ser. No. 161,452 filed in the names of Jack R. Chipman and Joseph E. Morrow. Th horizontal sweep circuitry 31, in addition to providing its normal horizontal sweep signal and output to a high voltage system 30, is illustrated as having an output on line 33 to a threshold circuit 41 the output of which may be alternately connected to the video amplifier 19 or the color matrixing circuit 37 by way of dotted lines 35 or 39 respectively. These last two dotted lines 35 and 39 represent alternate embodiments of the present invention as illustrated in more detail in FIGS. 2 and 3. The dotted line 35 corresponds to the embodiment illustrated in FIG. 3 and the dotted line 39 illustrates the embodiment illustrated in FIG. 2. Both embodiments employ basically the same threshold device 41.

Considering now FIG. 2, this threshold device 41 is enclosed in dotted lines having line 33 as its input and line 30 as its output. The input signal to the threshold device is derived from a resistor 43 which is connected between ground and the cathode of a horizontal output tube 45. This horizontal output tube 45 receives horizontal synchronization signals on its input line 47 and may provide an output to the high voltage system, the color convergence circuitry 48 of FIG. 1 and the horizontal deflection circuitry of the cathode ray tube 29 on its output line 49, and provides further output signals to the convergence and horizontal deflection circuitry on output line 51. The average value of the current flowing in the resistor 43 is an accurate low power indication of the beam current flowing in the cathode ray tube 29, and for the purposes of providing an indication of this current, the resistor 43 has been inserted in the otherwise standard configuration of the horizontal output tube 45. The voltage appearing on line 33 is, of course, a sawtooth wave form, and a filter comprising resistor 52 and capacitor 53 is employed, and the voltage across the capacitor 53 which represents the average value of the horizontal output tube cathode current is applied to a transistor 55. The capacitor 53 must be large enough to smooth out the sawtooth wave form, yet be small enough to respond quickly to changes in the brightness level. Similarly, the turn-on characteristics of the transistor 55, the size of the resistor 43, and the relationship between the horizontal output tube cathode current and the cathode ray tube beam current which is to be limited must be analyzed for a specific situation, In one preferred embodiment it was decided that about 1.5 milliamperes should be the limit on the cathode ray tube beam current, and employing a type 31LQ6 horizontal output tube this 1.5 milliampere beam current corresponds to an average horizontal output tube cathode current of about 290 milliamperes. Employing a silicon transistor having a turn-on voltage of around 600 millivolts (base to emitter), the value of the cathode resistor 43 may be readily calculated as slightly over two ohns. Such a small resistance in the cathode circuit of the horizontal output tube, of course, has negligible effect on the overall operation of the horizontal output circuit. This specific embodiment also illustrates that the component values are in the range of economical components and that no extremely high voltages are associated with the present beam current limiting circuit.

Thus the transistor 55 is rendered conductive when the cathode ray tube current or the horizontal output tube cathode current exceeds a predetermined threshold and is otherwise nonconductive. This transistor 55, which is connected in a common emitter configuration, also has a capacitor 57 coupled between its collector and emitter to prevent oscillation of the circuit as will be described later in more detail. The cathode ray tube 29 which is here illustrated as a color tube has its grids 59 coupled in normal fashon to a cathode ray tube bias potentiometer 61. When the wiper arm 63 of this potentiometer is moved so that the voltage on the wiper arm decreases, the voltage on the cathode ray tube grids also decreases thus lowering the cathode ray tube beam current. If the transistor 55 were to switch from its nonconducting to its conducting state the potential on the wiper arm 63 would also be diminished thus resulting in a decrease in the cathode ray tube beam current. A similar result could, of course, be obtained by connecting the line 39 either directly to the wiper arm 63 or to the point 65 at the other end of the bias potentiometer 61. Some problem has, however, been encountered in practice when connecting the line 39 directly to the wiper arm 63 rather than as illustrated. A D. C. restoration pulse for the color difference signals is supplied by way of line 67, and the presence of capacitor 57 between the wiper arm 63 and ground may cause degradation of this pulse. Also it should be clear from FIG. 2 that both the transistor 55 and the capacitor 57 should be capable of withstanding the 280 volt direct current involved in this circuit.

The capacitor 57 is present in the circuit to prevent the following sequence of events:

the cathode ray tube beam current increases;

the horizontal output tube cathode current increases thus increasing the voltage drop across the cathode resistor 43;

capacitor 53 charges;

transistor 55 switches from its nonconductive to its conductive state;

the potential on the wiper arm 63 is decreased;

the cathode ray tube beam current decreases;

the horizontal output tube cathode current decreases;

the voltage drop across resistor 43 decreases;

the voltage on capacitor 53 decreases;

transistor 55 turns off;

the potential at the wiper arm 63 increases; and the entire system is now in an oscillatory state, since the next step is the first recited in this sequence. Capacitor 57 functions to dampen the system and prevent such oscillations.

Figure 3:
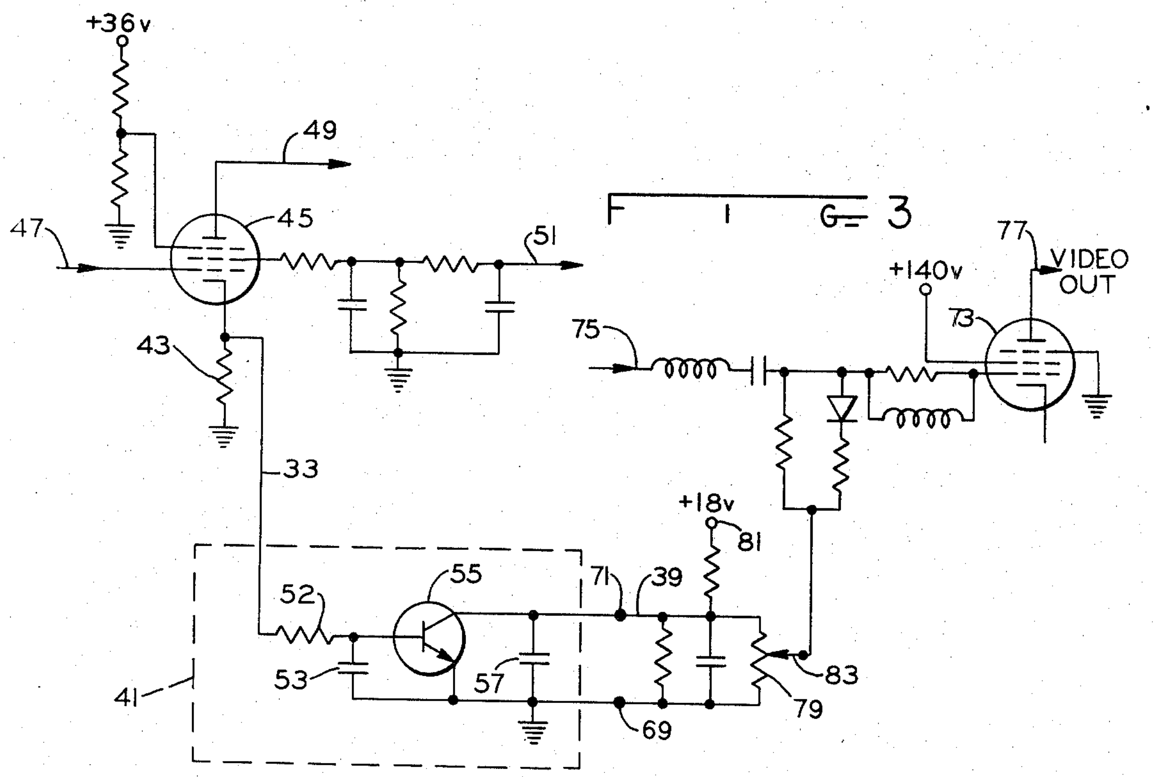
FIG. 3 is a schematic diagram of the relevant portions of FIG. 1 illustrating the control being applied to the brightness control potentiometer of the video amplifier of FIG. 1.

As noted earlier the transistor 55 and capacitor 57 of FIG. 2 must be rated at about 280 volts D. C. and such components, while not prohibitively expensive, do represent a substantial cost in a highly competitive market, and the circuit of FIG. 3 may be employed as an alternate to that shown in FIG. 2 in order to further reduce the costs of implementing the present invention. Comparing FIGS. 2 and 3 it will be noted that all of the circuitry to the left of the points 69 and 71 are identical (except for their voltage ratings), and the performance of the left hand portion of the circuit of FIG. 3 will be identical to that previously described for FIG. 2. FIG. 3 also inclues a video output tube 73 (found in the video amplifier 19 of FIG. 1) which receives incoming video signals on line 75 to provide video output signals on line 77 and includes in well known fashion a brightness control potentiometer 79. Those portions to the right of points 69 and 71 in FIG. 3 illustrate prior art well known circuitry for implementing a brightness control in conjunction with a video output tube except that the terminal 81 is connected to a positive 18 volt D. C. source, whereas typical prior art circuitry has this terminal 81 connected to the screen grid of the video output tube 73 and to a much higher voltage positive direct current source, for example, 140 volts. The lower 18 volt direct current source, of course, supplies the voltage for operation of the transistor 55 and allows the use of low voltage components 55 and 57 to replace the relatively higher voltage components illustrated in FIG. 2. This embodiment also alleviates another problem since no signal analogous to the D. C. restoration pulse of FIG. 2 is present on the brightness control of FIG. 3.

As is well known in brightness control circuits the wiper arm 83 of the potentiometer 79 may be moved so as to increase or decrease the bias on the control grid of the video output tube 73. The switching on of the transistor 55, of course, lowers the potential on the wiper arm 83 relative to ground and thus diminishes the plate current in the video output tube 73 and accordingly decreases the cathode ray tube beam current.

Figure 4:
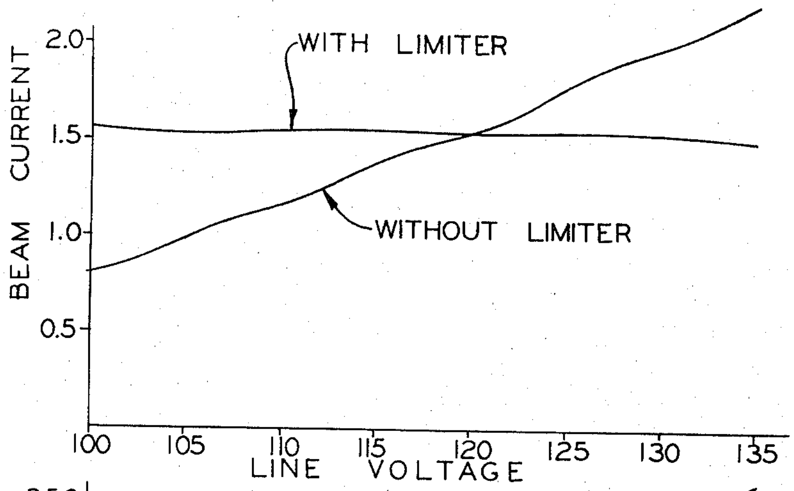
FIG. 4 is a graph showing the variation of cathode ray tube beam current as a function of variations in the line voltage with and without the limiter circuit of the present invention.
Figure 5:
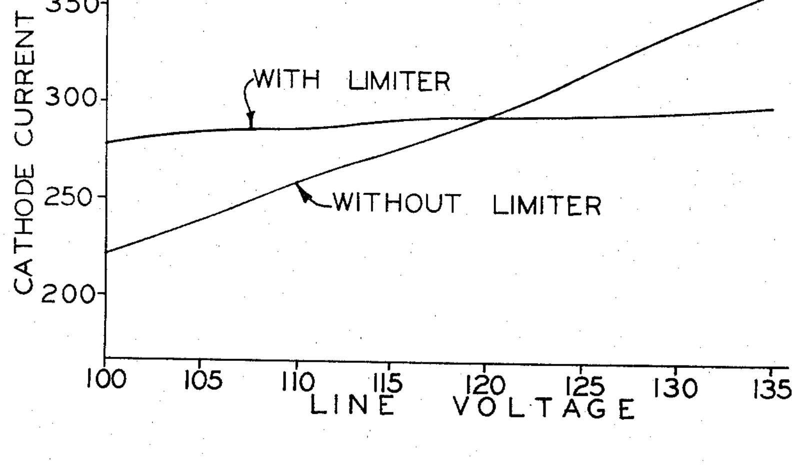
FIG. 5 is a graph showing the variation of the horizontal output tube cathode current as a function of changes in line voltage with and without the limiter circuit of the present invention.

The circuit of FIG. 3 has been incorporated in a prior art television receiver manufactured by the assignee of the present invention which employs a type 31LQ6 horizontal output tube and a type 9KX6 video output tube using the following specific values for the circuit elements: 43–2 ohms; 52–1,000 ohms; 53–100 microfarads; 57–33 microfarads; and 79–250,000 ohms. The regulation of cathode current in the horizontal output tube and cathode ray tube beam current with variations in line voltage for this system are illustrated in FIGS. 5 and 4 respectively.

Thus while the present invention has been described with respect to two specific embodiments, numerous modifications will suggest themselves to those of ordinary skill in the art, and accordingly the scope of the present invention is to be measured only by that of the appended claims.

What is claimed is:

1. A circuit for limiting the beam current in a cathode ray tube disposed in a television receiver having a horizontal output circuit and a high voltage developing circuit which derives its energization from the horizontal output circuit comprising:

means for detecting a current in the horizontal output circuit which increases when said beam current increases and decreases when said beam current decreases and for providing an output voltage indicative of such changes;

threshold means responsive to said output voltage for providing a relatively high impedance when said output voltage is below a predetermined threshold and a relatively low impedance when said output voltage exceeds the predetermined threshold;

circuitry for energizing said cathode ray tube to display information thereon including at least one impedance intensity point such that variations in the impedance between this impedance intensity point and ground cause corresponding variations in the cathode ray tube beam current; and means connecting said threshold means between an impedance intensity point and ground.

2. The circuit of claim 1 wherein the television receiver has a cathode ray tube bias control circuit, said impedance intensity point being a point in said cathode ray tube bias control circuit.

3. The current of claim 1 wherein the television receiver has a cathode ray tube brightness control circuit, the impedance intensity point being a point in said brightness control circuit.

4. The circuit of claim 1 wherein the threshold means comprises a transistor connected in a common emitter configuration and responsive to an increase in said output voltage above said predetermined threshold to substantially diminish its collector-emitter impedance.

5. The circuit of claim 1 wherein said horizontal output circuit includes a horizontal output tube and said means for detecting comprises a resistor coupled between the cathode of the horizontal output tube and ground.

6. The circuit of claim 5 wherein the threshold means comprises a transistor connected in a common emitter configuration and responsive to an increase in said output voltage above said predetermined threshold to substantially diminish its collector-emitter impedance.

7. The circuit of claim 6 further comprising:

a first capacitor coupled between said transistor base and ground to provide an average value of said horizontal output tube cathode current as the input to said transistor; and a second capacitor coupled between said transistor collector and emitter to prevent oscillation of the circuit.

8. In a television circuit having a horizontal output tube and a cathode ray picture tube the high voltage for which is derived from the output of the horizontal output tube, an automatic horizontal output tube cathode current limiter comprising:

means for sensing the cathode current in said horizontal output tube and providing an output indicative thereof; and threshold means responsive to said output exceeding a predetermined value to diminish the beam current in said cathode ray tube whereby said horizontal output tube cathode current is also diminished.

* * * * *